United States Patent [19]

Goodman et al.

[11] 4,373,544
[45] Feb. 15, 1983

[54] CHECK VALVE

[75] Inventors: Robert B. Goodman, West Hartford; James T. Triba, Enfield, both of Conn.

[73] Assignee: United Technologies Corporation, Hartford, Conn.

[21] Appl. No.: 310,587

[22] Filed: Oct. 13, 1981

Related U.S. Application Data

[63] Continuation-in-part of Ser. No. 191,037, Sep. 25, 1980, abandoned.

[51] Int. Cl.³ .............................................. F16K 15/06
[52] U.S. Cl. ................................. 137/220; 137/514.5
[58] Field of Search ................ 137/220, 514, 514.3, 137/514.5, 514.7

[56] References Cited

U.S. PATENT DOCUMENTS

| | | | |
|---|---|---|---|
| 1,466,171 | 8/1923 | Jacobsen | 137/514.5 |
| 1,802,720 | 4/1931 | Junkers | 137/220 X |
| 2,925,825 | 2/1960 | Staiger | 137/514 |
| 2,927,604 | 3/1960 | Johnson | 137/514.5 |
| 2,928,417 | 3/1960 | Buckner | 137/538 |
| 3,113,583 | 12/1963 | Fox | 137/220 |
| 3,134,394 | 5/1964 | Ohta | 137/220 |
| 3,194,255 | 7/1965 | Flaton | 137/514.7 X |
| 3,586,033 | 6/1971 | Hieber | 137/220 |
| 3,993,093 | 11/1976 | Mokveld | 137/220 X |

FOREIGN PATENT DOCUMENTS

| | | | |
|---|---|---|---|
| 1817272 | 6/1970 | Fed. Rep. of Germany | 137/220 |
| 328835 | 5/1930 | United Kingdom | 137/514.7 |

*Primary Examiner*—Robert G. Nilson
*Attorney, Agent, or Firm*—John Swiatocha

[57] ABSTRACT

A low pressure drop check valve includes an apertured, streamlined guide body (45) mounted on struts (40) which accommodate thermal and fluid loading and also includes a streamlined poppet or valve element (35) disposed within a housing. Forward flow through the valve unseats the valve member, which receives therewithin a face (50) of the guide body allowing flow around the valve member and guide body. Reverse flow is accommodated by apertures (60) and (65) in the guide body, flow through the apertures being applied to an inner surface of the valve element, thereby seating of the valve element for blocking such reverse flow. The check valve is also provided with means (70) and (85) for minimizing valve element oscillation and bounce. Maintenance of the valve in an open condition is enhanced by maintenance of a low pressure region downstream of the poppet.

11 Claims, 3 Drawing Figures

CHECK VALVE

This is a continuation-in-part application of U.S. Application Ser. No. 191,037, filed Sept. 25 1980, now abandoned.

DESCRIPTION

1. Technical Field

This invention relates generally to fluid check valves and more specifically to such check valves adapted for use in a compressor bleed flow system of a gas turbine engine.

2. Background Art

It is a common practice to bleed compressor discharge air from the compressor section of a gas turbine engine employed as a propulsion means for jet aircraft. Air is bled from the compressor to prevent surge of the engine during starting and acceleration conditions, for heating the aircraft cabin and for warming wing sections and other surfaces of the aircraft to prevent icing thereof. Systems for bleeding air from the compressor discharge typically employ check valves which prevent reverse flow through the systems which would occur, for example, when the bleed systems from multiple engines communicate with one another and one of the engines becomes inoperational. Without reverse flow checking, such a condition would cause air bled from operational engines to flow to any inoperational engine, thereby interfering with the performance of the auxilliary heating equipment referred to hereinabove. The check valves employed in such bleed systems must be capable of passing air at pressures in the neighborhood of 300 psi at temperatures of about 800° F. and must be capable of rapidly closing under reverse flow conditions.

Prior art compressor bleed check valves have typically been of the flapper variety. Such flapper valves are characterized by a minimum of valve element bearing area in comparison to the flow area of the valve. This lack of bearing area militates against the durability of the valve, causing premature wear of the valve seats due to fluttering impact between the valve and the seats. An example of a prior art flapper type compressor bleed check valve is found in U.S. Pat. No. 2,925,825 to Staiger. While various other one-way or check valves are known in the prior art, such valves are often provided with flowpaths therethrough which are restricted, tortuous or otherwise contribute to undesirable pressure drop through the valve. U.S. Pat. No. 2,927,604 to Johnson and U.S. Pat. No. 2,928,417 to Buckner et al are illustrative of alternate prior art check valve arrangements. While U.S. Pat. No. 3,134,394 to Ohta illustrates a check valve having lower pressure drop characteristics than other of the check valves discussed hereinabove, it is believed that the check valve of the present invention represents significant advances in pressure drop characteristics and rapid reverse flow checking over the Ohta valve. U.S. Pat. No. 1,802,720 to Junkers, U.S. Pat. No. 3,993,093 to Mokveld, U.S. Pat. No. 3,586,033 to Hieber and U.S. Pat. No. 3,194,255 to Flaton et al and German Pat. No. 1,817,272 to Ratelband also disclose various check (one-way) valves. However, it has been determined that these valves exhibit neither sufficient compactness nor adequate ability to accomodate distortion due to fluid pressure and thermal loading consistent with the requirements of bleed air check valves employed in modern, gas turbine powered aircraft.

DISCLOSURE OF INVENTION

It is therefore an object of the present invention to provide an improved check valve having a valve element supported on bearings of substantial area wherein flutter and wear through fluttering impact are minimized.

It is another object of the present invention to provide an improved check valve wherein the flow through the valve is characterized by minimal restrictions and a generally non-tortuous flowpath.

It is another object of the present invention to provide an improved check valve wherein the pressure drop across the valve is minimized.

It is another object of the present invention to provide an improved check valve characterized by rapid, but controlled checking under reverse flow conditions.

It is another object of the present invention to provide an improved check valve which accommodates distortion due to fluid loading and thermal effects.

It is another object of the present invention to provide an improved check valve characterized by enhanced compactness.

These and other objects which will become more apparent from the following detailed description taken in connection with the appended claims and accompanying drawings are achieved by the check valve of the present invention which is provided with an apertured aerodynamic guide body and an aerodynamic poppet or valve element disposed within a housing such that in forward flow conditions, the valve element and guide body define a streamlined center body mounted on struts which readily accommodate thermal and fluid loading of the valve. Under normal (forward) flow conditions, the valve element is axially spaced slightly from the center body for creation of a low pressure region at the interior of the valve element. This low pressure region enhances maintenance of the valve in an open condition. Under such forward flow conditions, a portion of the center body is received interiorly of the poppet for enhanced compactness. The center body and the valve housing define a flow passage of generally constant cross sectional area along the valve. Reverse flow through the valve is readily accommodated by the apertures in the guide body, such reverse flow being applied to an expansive concave surface of the poppet which rapidly seats under the influence of the reverse flow, thereby blocking further reverse flow through the valve. A damping piston and sleeve arrangement is received within the interior of the guide body, the poppet being secured to either the piston or sleeve such that the relative movement therebetween damps poppet motion thereby minimizing unwanted poppet oscillation and impact loads. The cylinder is vented to reduce the spring rate of the piston-sleeve arrangement to prevent piston bounce under valve opening conditions. The vent also reduces the magnitude of the vacuum drawn by the cylinder which would otherwise hamper valve closing. In the preferred embodiment, the sleeve is contiguously received within the cylinder, the cylinder and sleeve providing extensive bearing surfaces accommodating motion of the valve element within the check valve to inhibit unwanted flutter or other vibration.

BEST MODE FOR CARRYING OUT THE INVENTION

Figure 1:
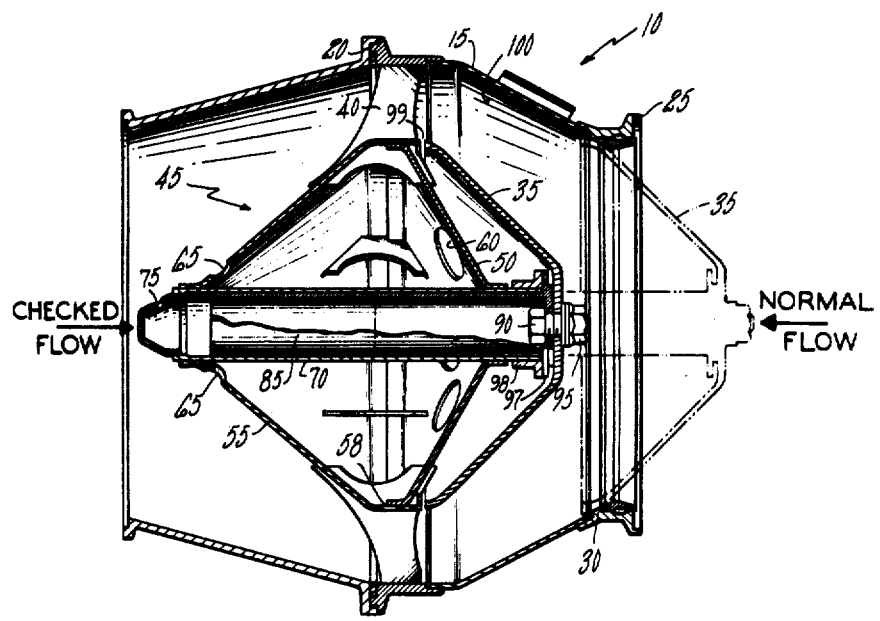
FIG. 1 is a side, cross-sectional elevation of the check valve of the present invention.
Figure 2:
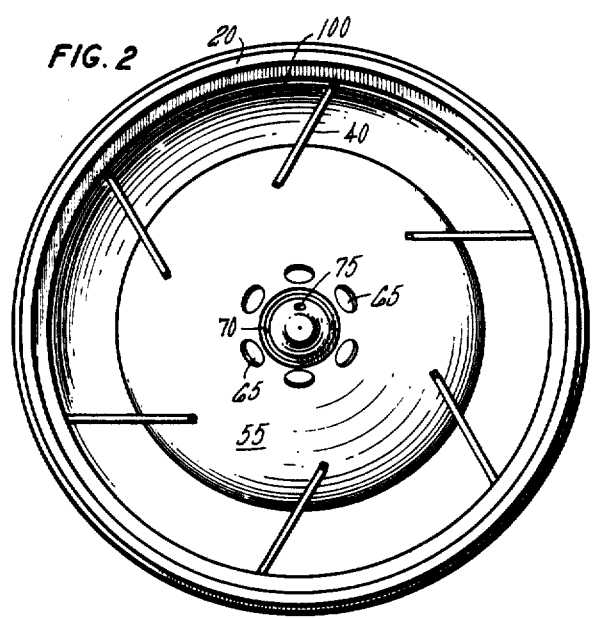
FIG. 2 is an end elevation of the valve.

Referring to the drawings, the check valve of the present invention is shown generally at 10 comprising a housing 15 having mounting flanges 20 and 25 at opposite ends thereof for mechanically connecting the valve to a pair of opposed duct ends. The housing also includes at the interior thereof an annular seat 30 which is engaged by poppet or valve element 35 for closing the valve under conditions of reverse flow (flow to the right in FIG. 1).

Figure 3:
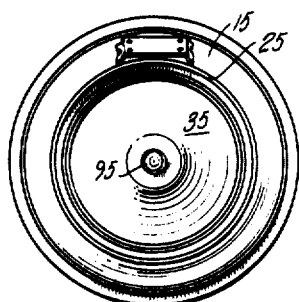
FIG. 3 is an elevation of the opposite end of the check valve.

Disposed within housing 15, and supported on struts 40 is a streamlined, aerodynamic guide body 45 which provides minimal opposition to forward flow. As best seen in FIG. 3, the struts are disposed between the housing and the guide body and extend in directions defined by components both radially outwardly from, and tangential to the guide body, such strut orientation allowing thermal and fluid pressure loading to be accommodated by a bending of the struts without overstressing of the attachment points of the struts to the housing and guide body.

Guide body 45 comprises leading and trailing (with respect to forward flow) faces 50 and 55 respectively, joined at 58 by any suitable means such as welding, brazing or similar bonding techniques or suitable fasteners such as rivets or the like. Leading face 50 is apertured at 60 and trailing face 55 is apertured at 65, the apertures readily accommodating reverse flow through the valve for application of that reverse flow to the inner (concave) surface of valve element 35 for the seating thereof. (See phantom lines in FIG. 1.) As shown, apertures 65 are substantially smaller than apertures 60, both apertures 60 and 65 being disposed generally centrally of the leading and trailing guide body faces. While this general relative sizing and spacing of the apertures is suitable for a compressor bleed air check valve for a gas turbine engine, it will be understood that the utility of the check valve of the present invention is not so limited, the size and spacing of the apertures being dictated by the type of fluid accommodated by the valve and the operating temperatures and pressures of that fluid.

The leading and trailing guide body faces are of a conical or convergent shape and provide mounts for damping cylinder 70 disposed interiorly of the guide body generally centrally therof. The cylinder is provided with a vent 75 at the downstream end thereof and accommodates a sleeve 85, generally contiguously to the cylinder interior. The cylinder and sleeve define a damping means or dashpot for minimization of valve element oscillation and impact with a stop described in detail hereinbelow. The vent softens or decreases the spring rate of the sleevecylinder arrangement to prevent valve element bounce when the valve is opened. The vent also aids in the draw of fluid into the cylinder under checking conditions, thereby militating against the formation of a vacuum within the cylinder which would interfere with the closing of the valve.

Valve element 35 is of a conical or convergent shape and is fixed to the end of sleeve 84 by any suitable means such as bolt 90 and mating nut 95. Where, as in the preferred embodiment, the cylinder and sleeve extend substantially the entire length of the check valve, it will be seen that these two members define extensive bearing surfaces on which the poppet is slidably supported while minimizing flutter or other unwanted vibration of the valve element.

The outermost portion of valve element 35 seals with seat 30 (as shown in phantom lines) when the valve is closed. As best seen in FIG. 1, valve element 35 comprises a concave shell, forward fluid flow through the valve being applied directly to the outer or convex valve element surface thereby opening the valve, positioning the valve element such that the leading guide body face is received in part interiorly of the valve element. When the valve is open, a flange or detent 97 fixed to poppet 35 by the bolt and nut engages a stop 98 fixed to cylinder 70 thereby spacing the outer portion of the poppet from the leading face 50 of the center body, such spacing being shown as gap 99. Gap 99 provides communication between fluid flow around the poppet and center body and the interiors of those members thereby creating a low pressure region at the downstream face of the poppet for enhanced maintenance of the valve in an open condition. Reverse (checking) flow is applied through apertures 65 and 60 in the guide body to the inner (concave) face of the valve element for seating against seat 30 thereby closing the valve. As best seen in FIG. 1, trailing guide body face 55 and the valve element 35 are generally conical, defining a streamlined center body within the interior of the valve. The center body, and the interior of housing 15 define a passage 100 of generally uniform cross sectional or flow area from one end thereof to the other. It will be appreciated that this uniform flow area along with the streamlined shape of the center body defined by the guide body and valve element result in minimum pressure drop across the check valve.

Accordingly, it is noted that the check valve of the present invention is characterized by a compactness and minimization of pressure drop there across ready accommodation of distortion due to thermal and fluid loading. The reciprocation of the valve element between open and closed conditions is damped by the sleevecylinder damping mechanism which, due to its disposition within the interior of the valve provides extensive bearing surfaces for the reciprocation of the poppet. The cylinder vent militates against piston bounce and hindrance of checking due to creation of a vacuum within the cylinder. Being disposed within the guide body, the cylinder and sleeve bearing surfaces are protected from contamination over substantially their entire length. The apertures provided in the leading and trailing faces of guide body 45 allow rapid checking at low reverse flows. Additionally, such low reverse flow checking is enhanced by the concave shell construction of the valve element itself, such structure providing effective capture of reverse fluid flow.

While the check valve of the present invention is illustrated without actuators or assists of any kind, the operation of the valve being controlled by the direction of the flow therethrough, it will be appreciated that springs, actuators or other assists may be employed as desired.

We claim:

1. A fluid check valve comprising:

a housing, defining an outer portion of a fluid channel;

a seat disposed within said housing;

a valve element positionable within said housing by fluid flow therethrough, said valve element, by application thereto of reverse fluid flow, being held in engagement with said seat for closing said check valve and, by application of forward fluid flow thereto, being unseated for opening said check valve; and an apertured guide body disposed within said housing and defining, with said valve element, under conditions of normal fluid flow, an inner wall of said fluid passage, said apertures accommodating reverse flow therethrough for application of said reverse flow to said valve element for seating said valve element and closing said check valve, said check valve being characterized by:

said guide body being mounted within the interior of said housing by a plurality of spaced struts, each of said struts being disposed between said housing and guide body and extending in directions defined by directional components both radially outward from and tangential to said guide body.

2. A fluid check valve comprising:

a housing, defining an outer portion of a fluid channel;

a seat disposed within said housing;

a valve element positionable within said housing by fluid flow therethrough, said valve element, by application thereto of reverse fluid flow being held in engagement with said seat for closing said check valve and, by application of forward fluid flow thereto, being unseated for opening said check valve; and an apertured guide body including leading and trailing apertured, streamlined faces and disposed within said casing and defining, with said valve element under conditions of normal fluid flow, an inner wall of said fluid passage, said apertures accommodating reverse flow therethrough for application of said reverse flow to said valve element for seating said valve element and closing said check valve, said check valve being characterized by said valve element comprising a concave shell, forward fluid flow through said valve impinging on an exterior face of said valve element unseating said valve element such that said leading guide body face is received at least in part interiorly of said valve element.

3. A fluid check valve according to claims 1 or 2 further characterized by said valve element and guide body defining a streamlined center body having generally conical leading and trailing surface portions.

4. A fluid check valve according to claims 1 or 2 wherein said valve element is spaced from said guide body for maintenance of a low pressure region adjacent a downstream face of said valve element when said valve is in an open condition.

5. A fluid check valve according to claim 1 or 2 further characterized by said fluid channel defined by said housing, said guide body and said valve element being of substantially uniform flow area throughout the length thereof.

6. A fluid check valve according to claims 1 or 2 further characterized by:

a sleeve fixed to one of said valve element and a guide body and a cylinder receiving said sleeve therewithin, said cylinder being fixed to the other of said valve element and guide body, said sleeve and cylinder providing means for damping oscillations of said valve element.

7. A fluid check valve according to claim 6 further characterized by said cylinder including a vent aperture therein for relief of fluid pressure within said cylinder to prevent valve element bounce as said sleeve moves toward said vent aperture and to enhance the intake of fluid to said cylinder as said sleeve moves away from said vent aperture.

8. A fluid check valve according to claim 6 further characterized by said sleeve being continguous to the interior of said cylinder, said cylinder and sleeve defining bearing surfaces on which said valve element is supported for movement relative to said seat.

9. A fluid check valve comprising:

a housing, defining an outer portion of a fluid channel;

a seat disposed within said housing;

a valve element positionable within said housing by fluid flow therethrough, said valve element, by application thereto of reverse fluid flow, being held in engagement with said seat for closing said check valve and, by application of forward fluid flow thereto, being unseated for opening said check valve and an apertured guide body including leading and trailing apertured, streamlined faces and disposed within said casing and defining, with said valve element under conditions of normal fluid flow, an inner wall of said fluid passage, said apertures accommodating reverse flow therethrough for application of said reverse flow to said valve element for seating said valve element and closing said check valve, said check valve being characterized by said valve element, when in an open condition, being axially spaced from said leading guide body face for the creation of a low pressure region adjacent the downstream face of said valve element for enhancing maintenance of said valve element in an open condition.

10. A fluid check valve according to claim 9 and further including a stationary stop, said valve element, including a detent engageable with said stop for spacing said valve element from said leading guide body face.

11. The fluid check valve according to claim 10 wherein said valve element is supported on bearing means disposed centrally of said check valve, said stop being fixed to said bearing means.

* * * * *